Figure 1:
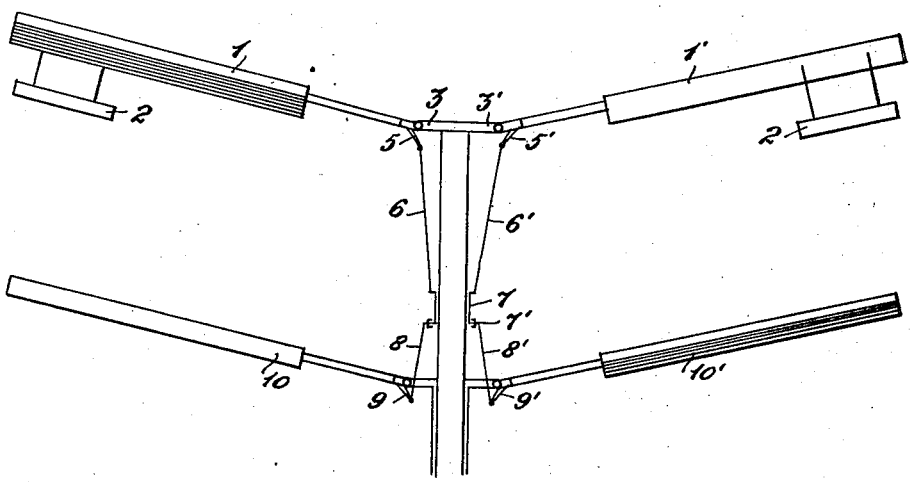

July 19, 1932.  C. D'ASCANIO  1,867,733
PROPELLER OF HELICOPTERS
Filed Jan. 8, 1932

Inventor:
Corradino d'Ascanio
By Williams, Bradbury, McCaleb & Hinkle
Attys.

Patented July 19, 1932

1,867,733

UNITED STATES PATENT OFFICE

CORRADINO D'ASCANIO, OF ROME, ITALY, ASSIGNOR TO PIETRO TROJANI, OF ROME, ITALY

PROPELLER OF HELICOPTERS

Application filed January 8, 1932, Serial No. 585,487, and in Germany January 8, 1931.

It is known that in order to assure automatically the stability of a helicopter it is advisable that the blades of the propellers be swivelled to the central shaft. It is also known that importance must be assigned to the automatic control of the incidence of the blades by means of stabilizing planes or the like connected to each blade.

If the blades are without an incidence controlling connection between them and the machine is tilted for the horizontal flight, the blades all take up the same angle of incidence respecting the relative wind on account of their stabilizing planes, while it is advisable that when the machine is tilted during its horizontal flight, the angle of incidence of the blade which works against the wind should diminish and the angle of the blade which works with the wind in favour should increase accordingly.

When interconnecting the blades so that they rotate about their axes all with the same angle and when then the main shaft is tilted, the blade which works against the wind is compelled to decrease its angle of inclination respecting the relative wind, while the blade which works with the wind in favour is compelled to increase its said angle. In this way, the blades have a much better balance, without the advantage of the automatic control of the incidence being lost.

Further, by interconnecting by incidence controlling means the blades of one propeller and connecting these incidence controlling means with the blades of another propeller rotating in the opposite direction, the advantage is obtained that it is sufficient to provide stabilizing planes on the blades of one propeller only, as the incidence of the other propeller will then be controlled by the propeller whose blades are provided with the stabilizing planes.

For the rotation of the blades of the propeller around their axes to control the incidence, each blade is swivelled on its support. If this swivel joint is provided at the end of a short arm which is secured to, or integral with, the driving shaft of the propeller, the advantage is obtained that the joint will not be subjected to bending stresses, as the driving couple is balanced by the couple produced by the centrifugal force of the blade together with the eccentricity which is created through the driving couple. For starting and when thus there is no centrifugal force, it is necessary to provide means which assure to the blades an extreme position of horizontal rotation respecting their joint.

The invention consists thus in providing between the blades of a propeller, which have stabilizing planes or another automatic incidence controlling device, an incidence controlling connection of such a type that all the blades rotate always through equal angles around their axes and also on their joint which consists in a swivel joint at the end of a short arm which is secured to, or integral with, the driving shaft of the blades, and also in providing a limiting and damping device for the horizontal rotation of the blades respecting their joints, so that through the combination of these devices all the above mentioned advantages are obtained.

If the helicopter has a plurality of propellers, of which one only is provided with stabilizing planes or other incident controlling devices, the incidence controlling connection of this propeller may also control by means of suitably arranged arms and rods the incidence of the other propeller which rotates in the opposite direction or of the other propellers not provided with automatic incidence controlling devices.

Figure 2:
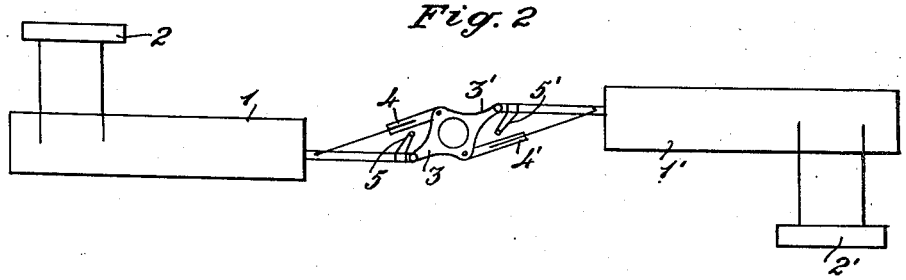

The invention will be described with reference to the accompanying drawing in which Fig. 1 shows schematically an axial section of a set of two helicopter propellers with incidence controls according to the invention, and Fig. 2 is a schematic plan view thereof.

The blades 1, 1' of the upper propeller, which are provided with stabilizing planes 2, 2' or other incidence controlling devices, are swivelled on short arms 3, 3' which are integral with, or secured to, the driving shaft of the propeller, so that the action of the driving couple sets up and eccentricity of connection and the couple produced by the eccentricity together with the contrifugal force balances the said driving couple. A set of telescopic rods 4, 4', whose movements may or may not be damped, sets up a limit to the horizontal rotation of the blades, so that when starting and when there is no centrifugal force, the blades have always a suitable position.

The blades are provided near their joint with arms 5, 5' which are connected by means of rods 6. 6' with one common sleeve 7, so that the rotation of a blade around its axis produced by the automatic incidence controlling device, is accompanied by the rotation through the same angle of the other blade of the same propeller around its axis on its swivel joint.

If there are two propellers as shown in Figure 1, rods 8, 8' are conducted from the sleeve 7 through suitable bearings to rods 8, 8' which are connected to arms 9, 9' integral with, or secured to, the blades 10, 10' of the other propeller which rotates in an inverse direction and which is the lower propeller in the example shown, and its blades may thus not be provided with an automatic incidence controlling device, as the incidence is controlled by the sleeve.

It is to be understood that the number of the blades of each propeller and the number of the propellers of the helicopter may be as desired without departing from the spirit of the invention.

What I claim is:

1. Helicopter wherein between the blades of a propeller, which have stabilizing planes or another automatic incidence controlling device, is arranged an incidence controlling connection with transmissions which compel all the blades to always take up an equal incidence so that all the blades rotate always through equal angles around their axes and on their joint which consists in a swivel joint at the end of a short arm which is secured to, or integral with, the driving shaft, a limiting and damping device being provided for the horizontal rotation of the blades respecting their joints, so that through the combination of these arrangements a perfect and automatic working of the propeller system of a helicopter is obtained.

2. Helicopter as in claim 1, wherein the incidence controlling connection between the blades of one propeller, which have an automatic incidence controlling device, control also through suitable transmissions the incidence of the blades of another propeller rotating in the opposite direction, which latter blades may therefore be without the automatic incidence controlling device.

In witness whereof, I hereunto subscribe my name this 26th day of December, 1931.

CORRADINO D'ASCANIO.